(12) United States Patent
Pangalila

(10) Patent No.: US 8,882,032 B2
(45) Date of Patent: Nov. 11, 2014

(54) MOUNTING SYSTEM FOR ATTACHING A STRUCTURAL MONUMENT IN A DESIRED POSITION IN AN AIRCRAFT CABIN

(75) Inventor: Iwan Pangalila, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 814 days.

(21) Appl. No.: 13/140,788

(22) PCT Filed: Nov. 23, 2009

(86) PCT No.: PCT/EP2009/008326
§ 371 (c)(1),
(2), (4) Date: Sep. 6, 2011

(87) PCT Pub. No.: WO2010/078884
PCT Pub. Date: Jul. 15, 2010

(65) Prior Publication Data
US 2011/0309194 A1 Dec. 22, 2011

Related U.S. Application Data

(60) Provisional application No. 61/203,129, filed on Dec. 19, 2008.

(30) Foreign Application Priority Data

Dec. 19, 2008 (DE) .......................... 10 2008 064 120

(51) Int. Cl.
*B64D 11/04* (2006.01)
(52) U.S. Cl.
CPC ...................................... *B64D 11/04* (2013.01)
USPC ...................................... 244/118.5; 244/131
(58) Field of Classification Search
CPC ....................................................... B64D 11/04
USPC .......................... 244/118.1, 118.2, 118.5, 131
See application file for complete search history.

(56) References Cited

U.S. PATENT DOCUMENTS 5,083,727 A    1/1992  Pompei et al.
6,007,025 A *  12/1999 Coughren et al. ......... 244/118.6
6,318,672 B1   11/2001 Traylor

FOREIGN PATENT DOCUMENTS

DE          4224821 A1    2/1994
WO     WO 2007/095000 A2  8/2007

OTHER PUBLICATIONS

International Search Report, PCT/EP2009/008326, International Search Authority/DE, Airbus Deutschland GmbH, Jul. 15, 2010.
English language translation of the Written Opinion for PCT/EP2009/008326, Jul. 5, 2011.
English language abstract of DE 4224821 A1, Feb. 3, 1994.

* cited by examiner

*Primary Examiner* — Rob Swiatek
(74) *Attorney, Agent, or Firm* — Krieg DeVault LLP

(57) ABSTRACT

A mounting system (10) for attaching a structural monument in a desired position in an aircraft cabin comprises a support element (12) that is connectable to a base body (14) of the structural monument in a pedestal area of the structural monument. The mounting system (10) further comprises a receiving device (50) that is attachable in an area of a floor of the aircraft cabin, and a first coupling element (38) attached to the support element (12), designed for connecting the supporting element (12) to the receiving device (50) that is attachable in an area of a floor of the aircraft cabin. Finally, the mounting system (10) comprises a retaining element (76) that is connectable to the base body (14) of the structural monument in a ceiling area of the structural monument, and a second coupling element (86) attached to the retaining element (76), designed for connecting the retaining element (76) to a structurally solid component of the aircraft.

15 Claims, 8 Drawing Sheets

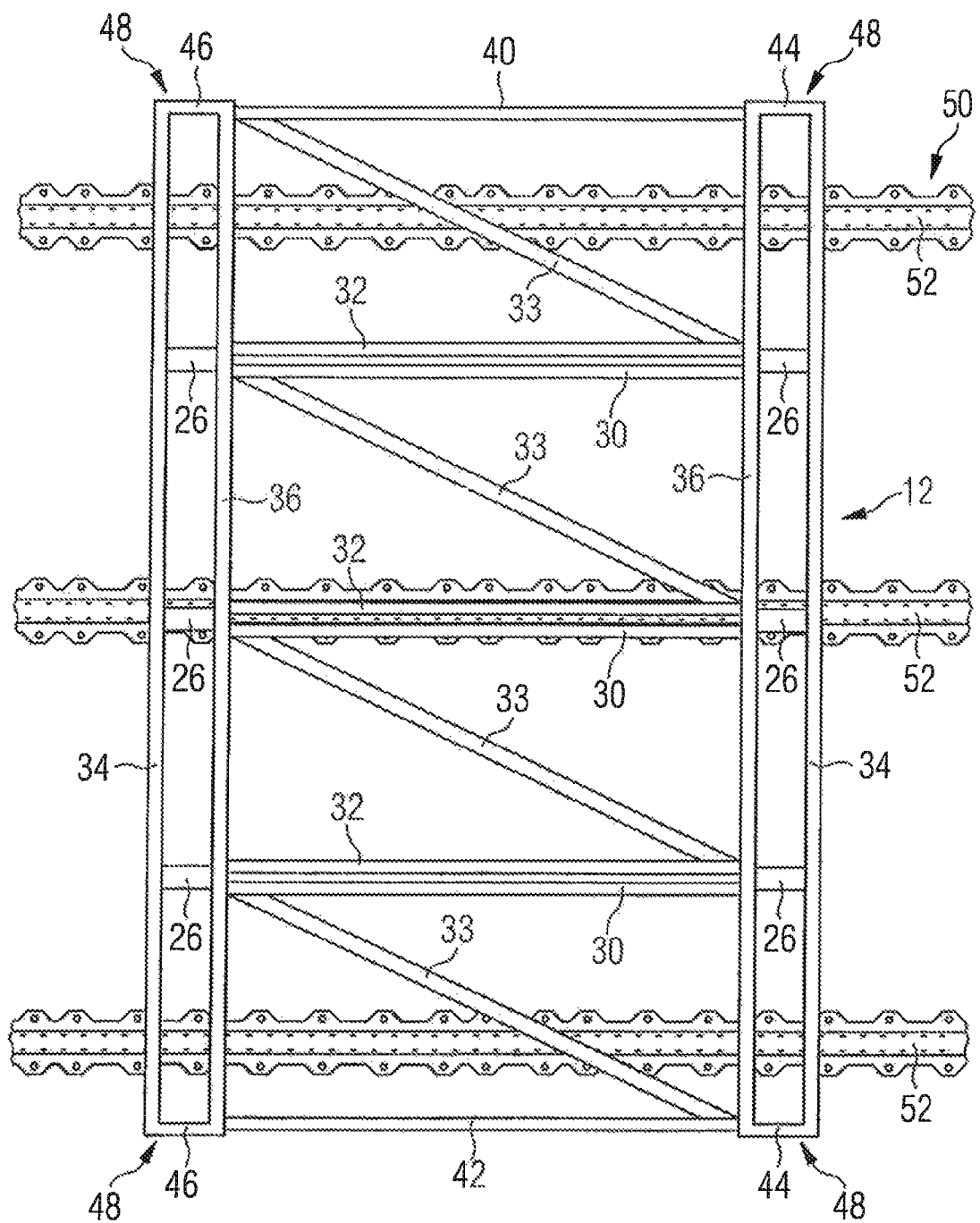

Figure 1:
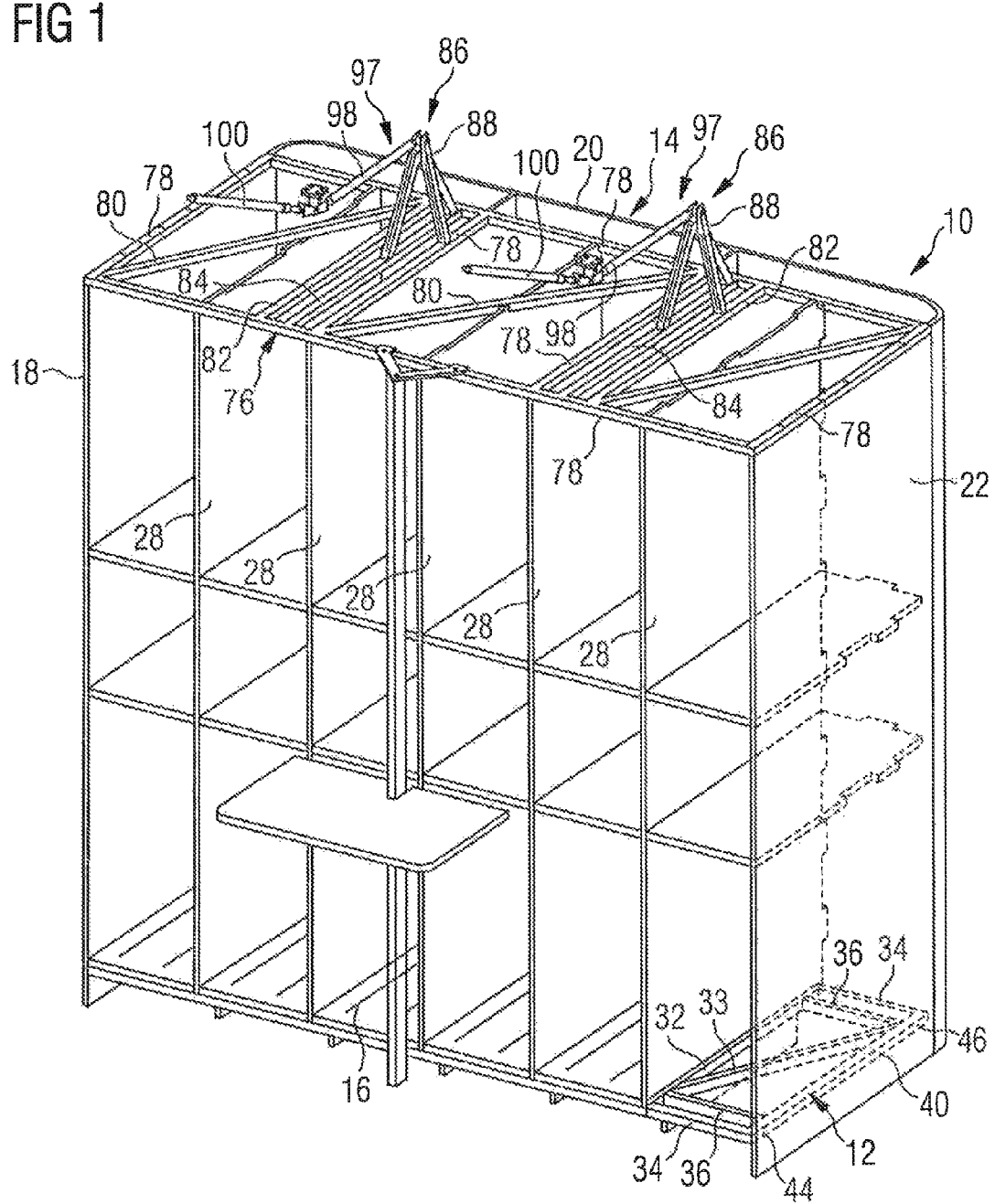
Figure 2A:
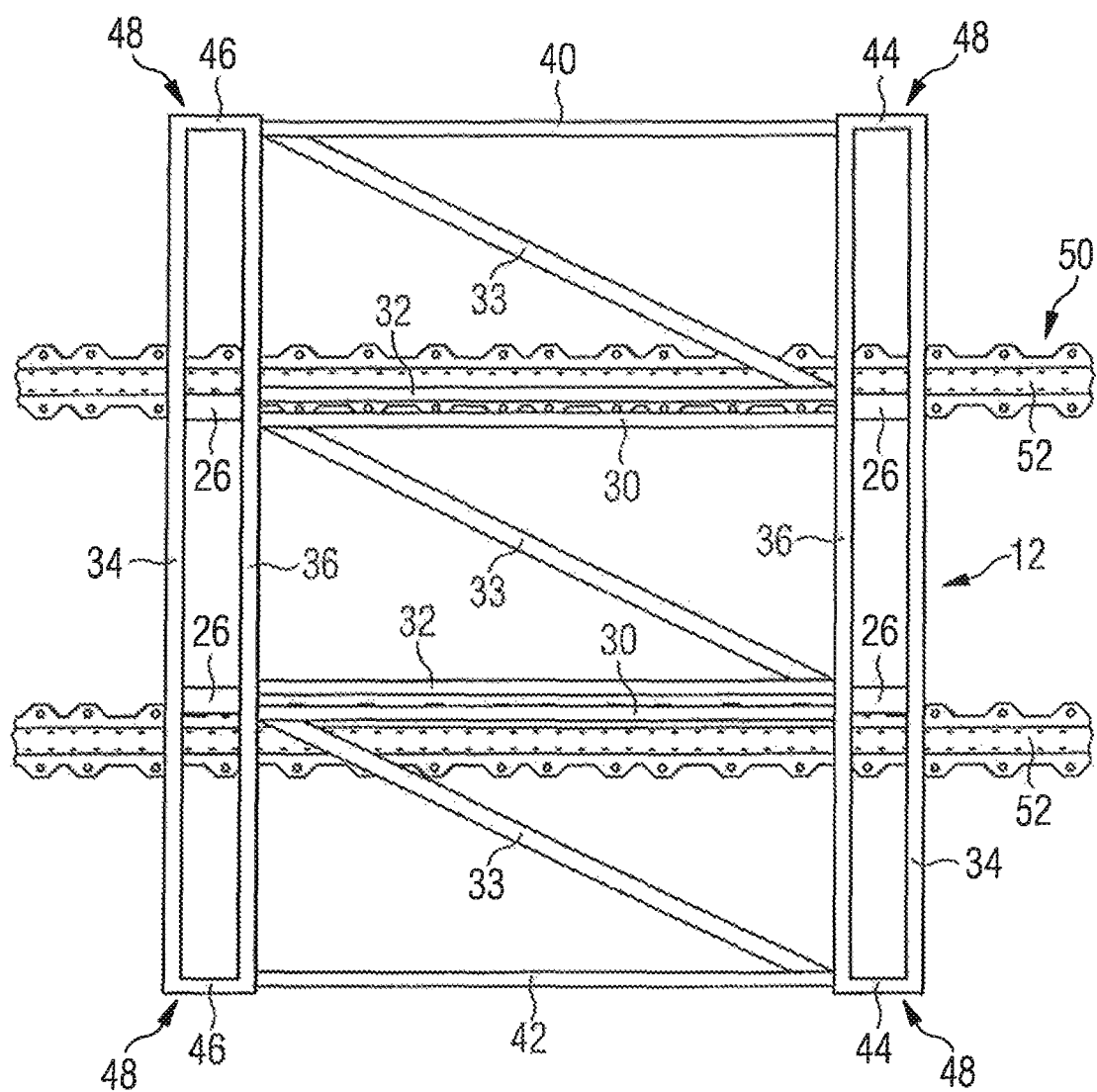
Figure 2B:
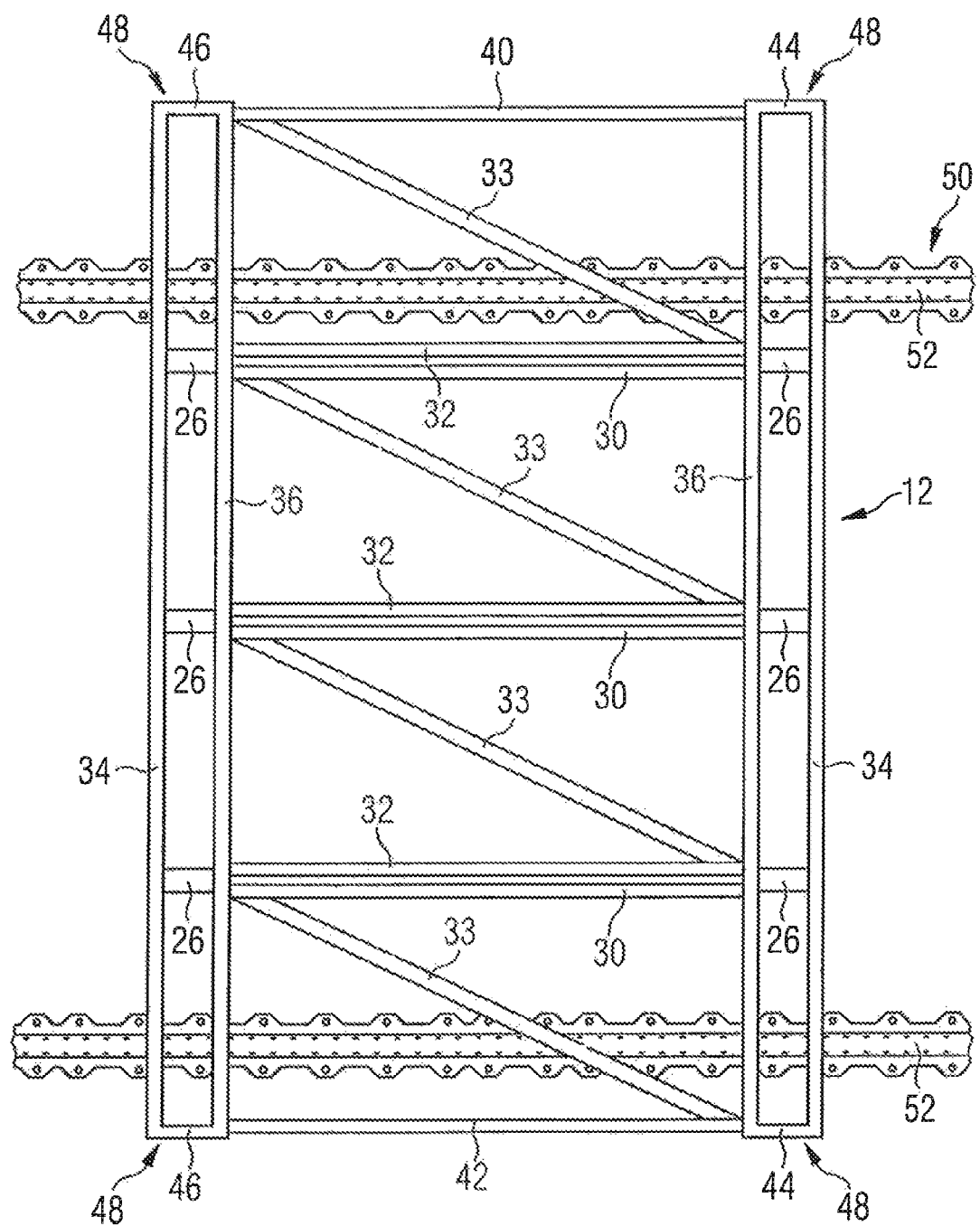
Figure 2D:
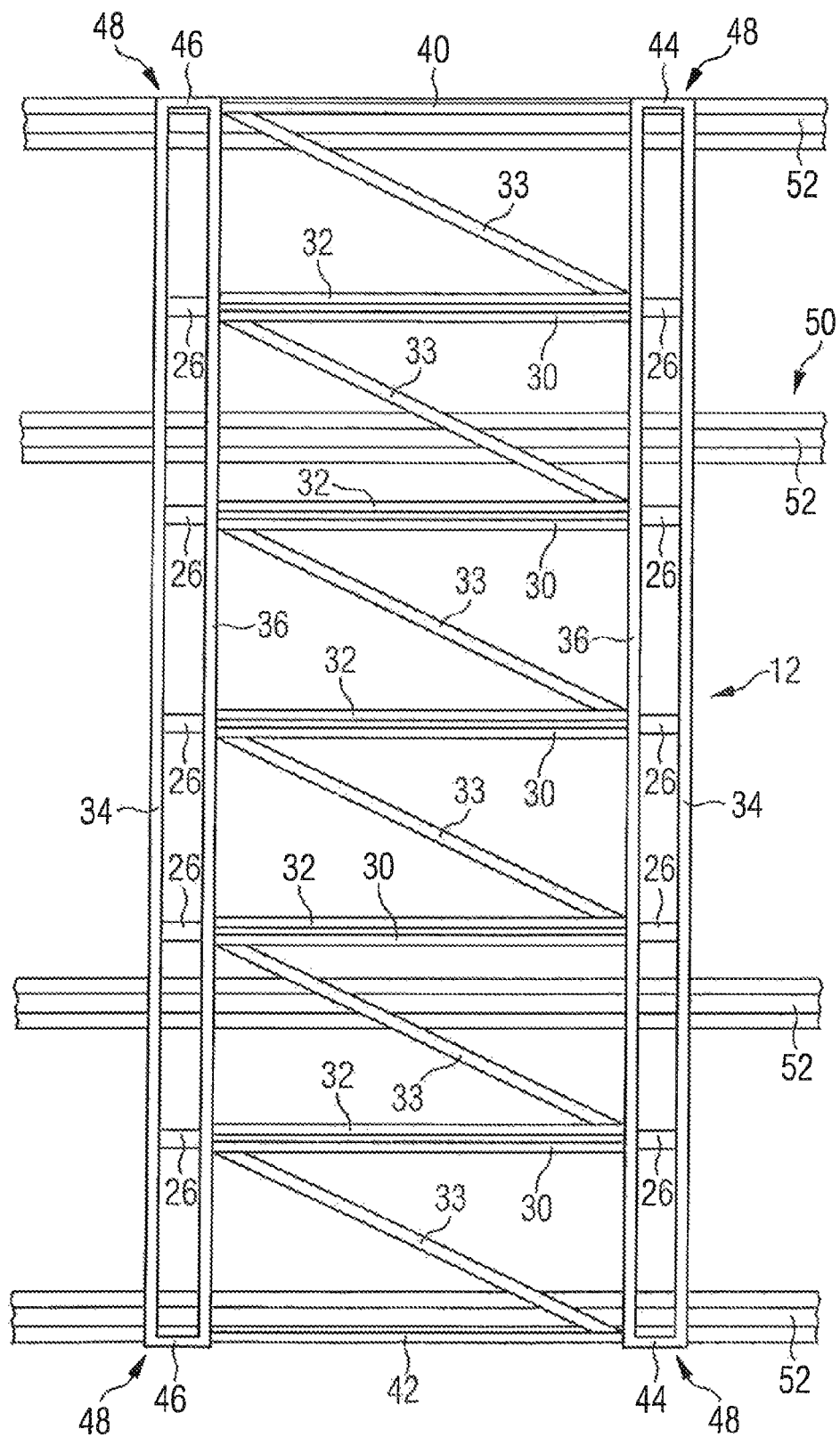

MOUNTING SYSTEM FOR ATTACHING A STRUCTURAL MONUMENT IN A DESIRED POSITION IN AN AIRCRAFT CABIN

CROSS REFERECE TO RELATED APPLICATIONS

The present application is a §371 national stage patent application of PCT/EP2009/008326, filed Nov. 23, 2009, claiming priority to German Patent Application No. 10 2008 064 120.0 and US Provisional Patent Application No. 61/203, 129, both filed Dec. 19, 2008, which are incorporated herein by reference.

The present invention relates to a mounting system for attaching a structural monument in a desired position in an aircraft cabin. The invention further relates to the use of such a mounting system for attaching an aircraft galley in a desired position in an aircraft cabin.

An aircraft galley of modular construction comprising a base body with a plurality of compartments is known from WO 2007/095000 A1. Various appliances, such as, for example, an oven or a microwave appliance, are arranged in the compartments of the base body. Furthermore, the compartments of the base body receive boxes of various sizes, in which service products, such as, for example, food or drinks, for supplying to the passengers on board the aircraft can be accommodated.

When mounting structural monuments, such as, for example, galleys, in an aircraft, it is customary at present to connect the monuments at defined attachment positions to the aircraft structure, in particular the crossmembers of the aircraft structure. For this purpose, individual components of the structural monuments, such as, for example, the outer and partition walls thereof, are connected directly to the aircraft structure. The attachment positions for the monuments on the aircraft structure and the design of the monuments that is adapted thereto are determined during the development of an aircraft type. Changes of the position of the monuments or design changes to the monuments thus usually require adaptation of the attachment points provided for the mounting of the monuments on the aircraft structure and can therefore often be implemented only with great difficulty.

The object on which the invention is based is to provide a mounting system for attaching a structural monument in an aircraft cabin which enables a more flexible positioning of the structural monument in the aircraft cabin and a more flexible design of the structural monument.

A mounting system, according to the invention, for attaching a structural monument in a desired position in an aircraft cabin comprises a support element that is connectable to a base body of the structural monument in a pedestal area of the structural monument. For example, the support element can be provided to be connected to the structural monument base body on an underside of the structural monument base body in the area of a floor element of the structural monument base body. Alternatively to this, however, the support element can also be designed integrally with the base body of the structural monument and, for example, form part of a floor of the structural monument base body. In the state when connected to the base body of the structural monument, a floor element of the structural monument base body is preferably supported by the support element.

The mounting system according to the invention further comprises a receiving device that is attachable in the area of a floor of the aircraft cabin. For example, the receiving device can be provided to be attached, in the area of crossmembers of the aircraft structure which support a floor panel of the aircraft cabin, to the floor panel supported by the crossmembers and/or directly to the crossmembers of aircraft structure.

A first coupling element is attached to the support element of the mounting system according to the invention, and is designed for connecting the support element to the receiving device that is attachable in the area of a floor of the aircraft cabin. If desired or required, the mounting system according to the invention can also be equipped with a plurality of first coupling elements. When the support element is connected as specified to the base body of the structural monument to be attached in a desired position in an aircraft cabin, the structural monument base body and thus the entire structural monument can be connected to the receiving device via the support element and the first coupling element and consequently anchored in the floor area of the aircraft cabin. The support element and the first coupling element thus ensure a decoupling of the structural monument base body from the receiving device. As a result, it is no longer necessary to adapt the design of the structural monument, i.e. for example the arrangement of outer and partition walls of the structural monument base body, to the position of the receiving device in the area of the floor of the aircraft cabin. Instead, it is merely necessary to attach the first coupling element at a suitable place to the first support element.

The mounting system, according to the invention, for attaching a structural monument at a desired position in an aircraft cabin further comprises a retaining element that is connectable to the base body of the structural monument in a ceiling area of the structural monument. A second coupling element is attached to the retaining element, and is designed for connecting the retaining element to a structurally solid component of the aircraft. If desired or required, the mounting system according to the invention can also be equipped with a plurality of second coupling elements. The structurally solid component can be a component connected rigidly to the aircraft structure, but also part of the aircraft structure itself. Similar to the support element and the first coupling element, the retaining element and the second coupling element attached to the retaining element also ensure a decoupling of the structural monument base body from an attachment point on the structurally solid component. Consequently, the design of the structural monument can be made independent of the position of the attachment point on the structurally solid component.

The mounting system according to the invention thus enables a more flexible design of the structural monument, so that the design of the structural monument can, if necessary, be more easily adapted to specific customer requests. Furthermore, as a result of the decoupling of the structural monument base body from the floor- and ceiling-side attachment points, a greater flexibility in the choice of the positions of the attachment points can be achieved. As a result, if necessary, the position of the structural monument in the aircraft cabin can be varied and adapted to specific customer requirements much more easily.

The receiving device can comprise at least one rail. The rail can be configured, for example, in the form of a conventional seat rail and comprise an anchoring element for anchoring the rail in the area of the floor of the aircraft passenger cabin, and a receiving area. The receiving area of the rail can be formed by a C-profile element in which circular and slot-shaped openings are alternately formed. If the receiving device comprises a rail, the first coupling element can be connected to the receiving device at different positions along the rail. As a result, a stable floor-side attachment of the structural monument at flexibly selectable positions is made possible. A particularly flexible positioning of the structural monument is possible when the receiving device comprises a plurality of rails which run in different directions, i.e. are oriented at different angles relative to a longitudinal axis of the aircraft cabin.

Alternatively or additionally to this, the receiving device can also comprise a plurality of individual receiving elements that are attachable in the area of the floor of the aircraft cabin. For example, the receiving elements can be attached in a specific pattern in the area of the floor of the aircraft cabin. The pattern formed by the receiving elements can, as required, also be a uniform or non-uniform point lattice with rectangular or square individual cells or a point pattern which defines a curved arcuate structure, an oval structure or a circular structure.

The first coupling element can comprise a supporting structure for supporting the support element and an attaching element. The attaching element is preferably configured in complementary fashion to a receiving area of the receiving device and serves to connect the first coupling element to the receiving device. If the receiving device comprises a seat rail, the attaching element of the first coupling element preferably has a head which is suitable for reception in a circular opening of the receiving area of the seat rail. To attach the attaching element in the seat rail, the attaching element can then be displaced relative to the rail until the head of the attaching element is arranged in a section of the receiving area of the rail that has merely a slot-shaped opening. The head of the attaching element is then retained in the receiving area of the rail by the arms of the C-profile element forming the receiving area which delimit the slot-shaped opening of the receiving area.

The first coupling element preferably further comprises a locking device. The attaching element is displaceable, in the unlocked state of the locking device, in the receiving area of the receiving device relative to the supporting structure of the first coupling element. By contrast, the attaching element is fixable, in the locked state of the locking device, in a desired position in the receiving area of the receiving device and relative to the supporting structure. For example, the locking device can, in the unlocked state, free a spring which displaces the attaching element in the receiving area of the receiving device and relative to the supporting structure of the first coupling element until the attaching element has reached in the receiving area of the receiving device a position in which the attaching element can be fixed in the receiving area of the receiving device. Alternatively to this, however, the locking device can also be designed such that it allows, in the unlocked state, a manual displacement of the attaching element in the receiving area of the receiving device and relative to the supporting structure.

A locking of the locking device can merely have the effect that the attaching element is fixed relative to the supporting structure of the first coupling element and as a result is also no longer displaceable in the receiving area of the receiving device. If desired or required, an additional attaching device, such as, for example, a screw or the like for fixing the attaching element in the receiving area of the receiving device can be provided. Alternatively to this, however, it is also conceivable for the attaching element to be fixed, in the locked state of the locking device, in a desired position in the receiving area of the receiving device by the locking device itself. For example, the locking device can be designed such that its locking has the effect that the attaching element is lifted or lowered relative to the supporting structure and as a result is anchored in the receiving area of the receiving device. For example, a lifting of the attaching element relative to the supporting structure can have the effect that a head of the attaching element is pressed against arms, which delimit a slot-shaped opening of the receiving area of the receiving device, of a C-profile element forming the receiving area of the receiving device and as a result is fixed in its position in the receiving area of the receiving device.

The supporting structure of the first coupling element can comprise a base element which is supported on the receiving device when the first coupling element is connected to the receiving device. The base element can be configured, for example, in the form of a frame. The first coupling element preferably further comprises a connecting element which serves to connect the first coupling element to the support element. The connecting element can, for example, be provided with suitable bores which serve to receive corresponding attaching devices, such as, for example, screws, for attaching the connecting element to the support element. A damping element is preferably arranged between the base element and the connecting element.

The support element of the mounting system, according to the invention, for attaching a structural monument in a desired position in an aircraft cabin can comprise a plurality of supporting struts. The supporting struts are preferably shaped and positioned such that, when the support element is connected to the base body of the structural monument, forces transmitted via outer and/or partition walls of the structural monument base body are introduced into the support element at least partly in the area of the supporting struts. In other words, the supporting struts of the support element are preferably shaped and positioned such that they support at least sections of outer and/or partition walls of the structural monument base body when the support element is connected as specified to the structural monument base body.

The support element of the mounting system according to the invention can further comprise a plurality of stiffening struts for stiffening the support element and thus increasing its mechanical loadability. The stiffening struts can extend at an angle with respect to the supporting struts of the support element, for example perpendicularly with respect to the supporting struts or diagonally with respect to the supporting struts. Alternatively or additionally thereto, the support element can further comprise a plurality of positioning struts for positioning an outer and/or a partition wall of the structural monument base body relative to the support element. For example, two positioning struts parallel to one another can be provided to receive between them an outer or a partition wall of the structural monument base body or sections of an outer or a partition wall of the structural monument base body. Finally, the support element can comprise a plurality of connecting struts for attaching the first coupling element to the support element. For example, the support element can comprise connecting struts, extending parallel to one another, for receiving the connecting element of the first coupling element between them.

The second coupling element of the mounting system according to the invention can comprise a connecting element for connecting the second coupling element to the retaining element. The connecting element of the second coupling element is preferably configured in the form of a three-legged stand or a four-legged stand. For example, the legs of the connecting element of the second coupling element can extend from a top side of the retaining element that can be connected to the base body of the structural monument in a ceiling area of the structural monument. The connecting element of the second coupling element can be rigidly fixed to the retaining element. However, the connecting element of the second coupling element and the retaining element are preferably designed such that the connecting element of the second coupling element can be attached to the retaining element at different positions. The attachment of the connecting element of the second coupling element to the retaining element can be effected by means of suitable attaching devices, such as, for example, screws.

The second coupling element preferably further comprises an attaching element of variable length for connecting the retaining element to the structurally solid component of the aircraft. The possible variation in length of the attaching element is preferably greater than 2.5 cm. As a result, it is possible to compensate for tolerances effectively. Furthermore, it is made possible for the structural monument to be displaceable in its position in the aircraft cabin over a certain distance without the need to release the connection, between the second coupling element and the structurally solid component of the aircraft for this purpose.

The attaching element of the second coupling element can comprise a first tension bar pivotably connected to the connecting element of the second coupling element. Furthermore, the second coupling element can comprise a second tension bar pivotably connected to the first tension bar. The tension bars pivotably connected to the connecting element of the second coupling element enable a comparatively flexible choice of the attachment position of the second coupling element on the structurally solid component or the aircraft structure itself. If the second coupling element comprises a first and a second tension bar, merely the second tension bar can be provided for connecting the second coupling element to the structurally solid component of the aircraft. Alternatively to this, however, it is also possible to fix both an end of the first tension bar facing away from the connecting element of the second coupling element and an end of the second tension bar facing away from the first tension bar to a structurally solid component of the aircraft.

In a preferred embodiment of the mounting system, according to the invention, for attaching a structural monument in a desired position in an aircraft cabin, the first and/or the second tension bar of the second coupling element is/are of telescopic design. As a result, a variation in length of the attaching element can be realised in a simple manner.

Similar to the support element, the retaining element can also comprise a plurality of supporting struts which are shaped and positioned such that, when the retaining element is connected to the base body of the structural monument, forces transmitted via outer and/or partition walls of the structural monument base body are introduced into the retaining element at least partly in the area of the supporting struts.

The retaining element can further have a plurality of stiffening struts for stiffening the retaining element, which struts, similar to the stiffening struts of the support element, can run at an angle, preferably perpendicularly or diagonally, with respect to the supporting struts. Alternatively or additionally to this, the retaining element can comprise a plurality of connecting struts for attaching the second coupling element to the retaining element. For example, the retaining element can have for each second coupling element three struts running parallel to one another, which are formed as connecting struts and/or supporting struts. The legs of one connecting element, configured in the form of a four-legged stand, of the second coupling element can then be supported on the connecting struts and/or supporting struts.

The above-described mounting system is usable particularly advantageously for attaching an aircraft galley in a desired position in an aircraft cabin.

Figure 3:
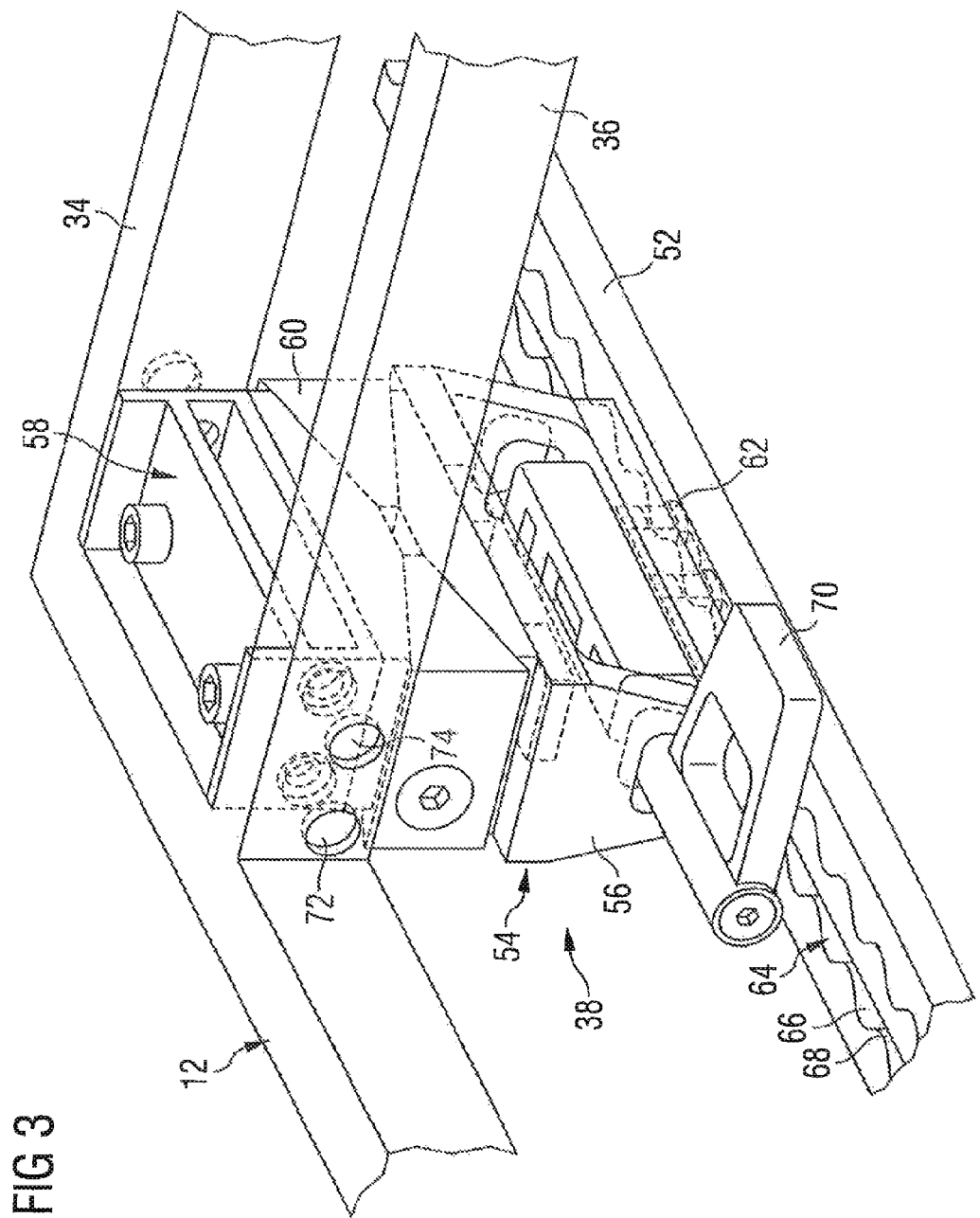
Figure 4:
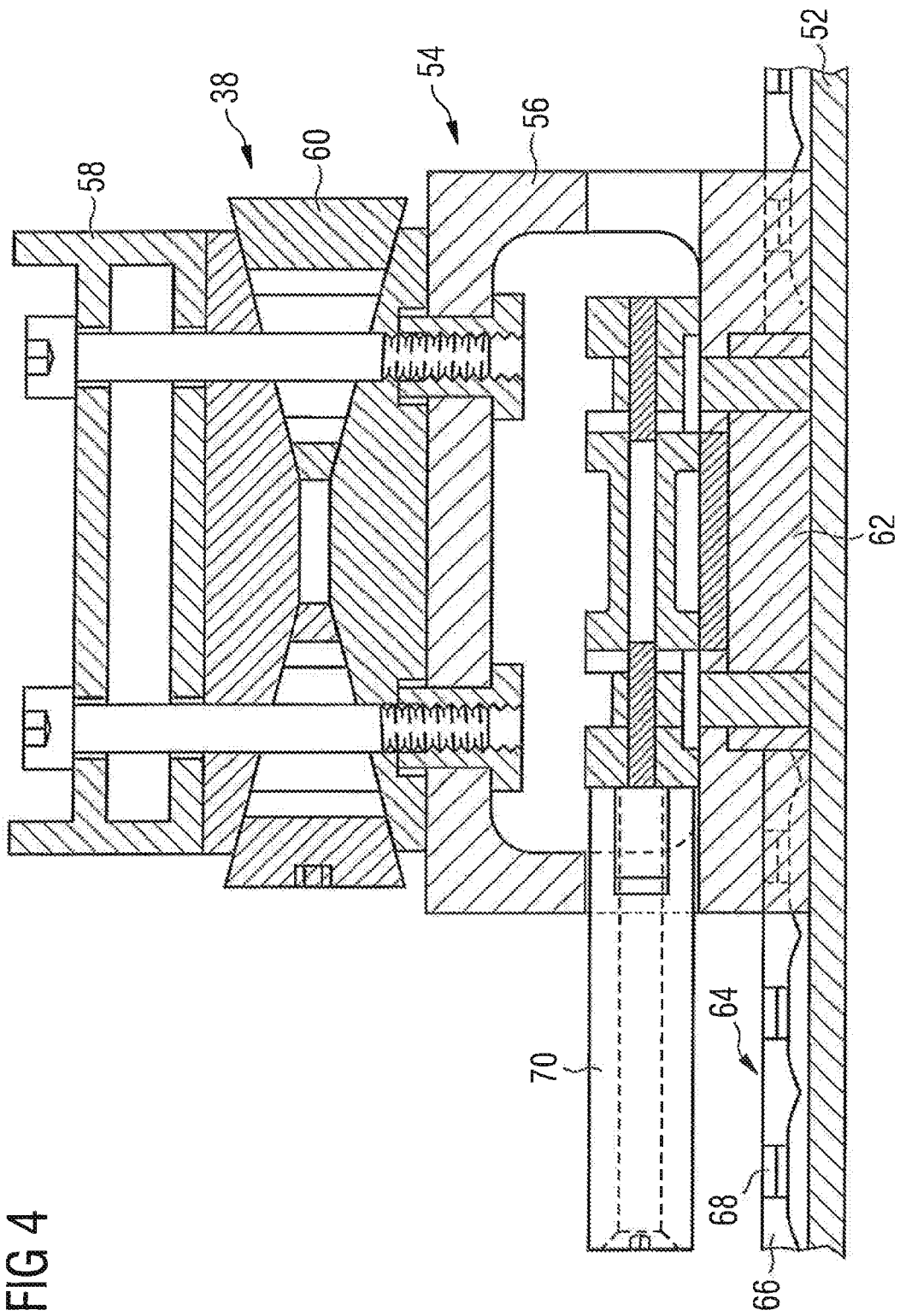
Figure 5:
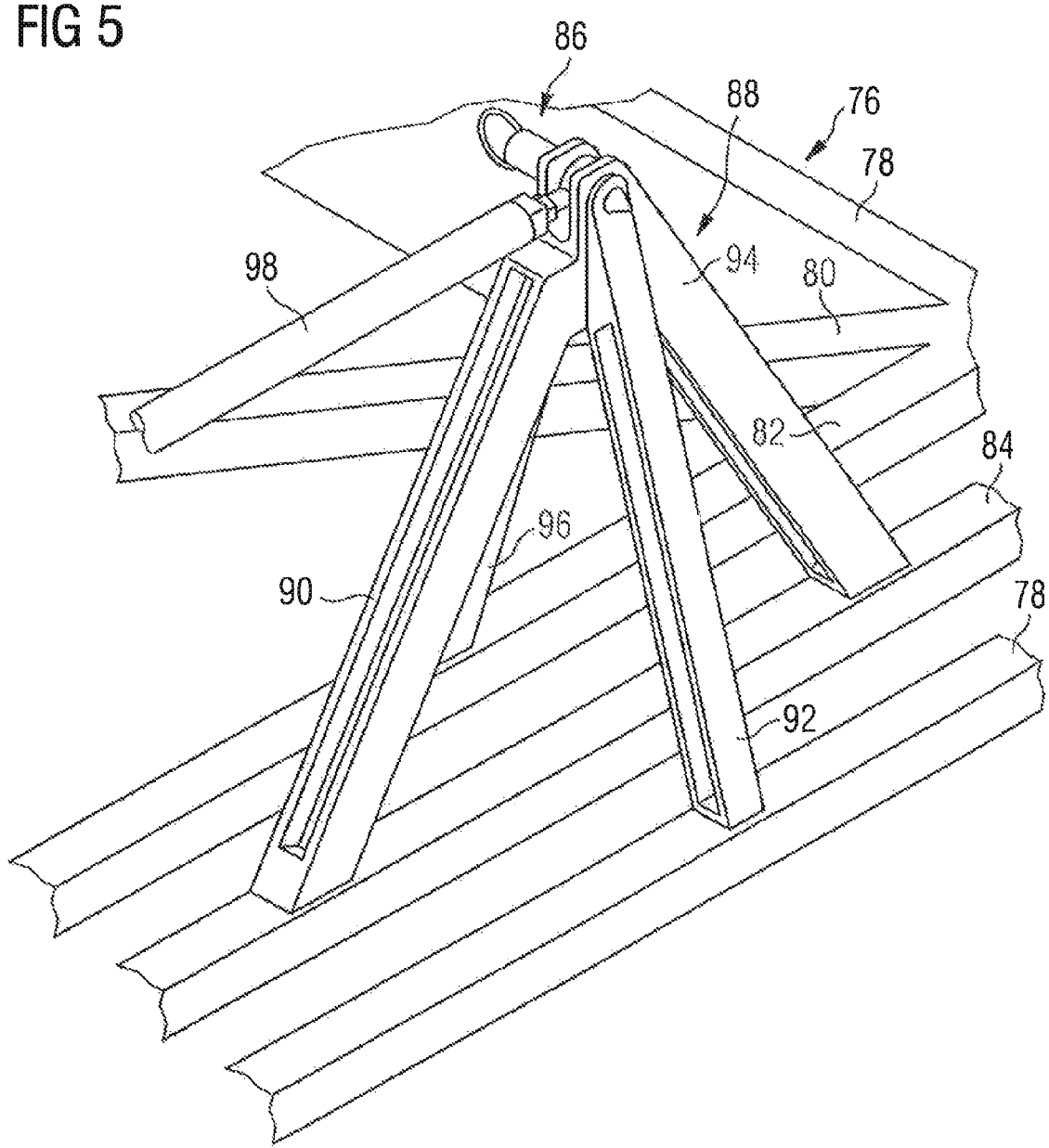

Preferred embodiments of the invention will now be explained in more detail with reference to the appended schematic drawings, of which FIG. 1 shows a base body of a structural monument, which base body is connected to a support element and a retaining element of a mounting system for attaching the structural monument in a desired position in an aircraft cabin, FIGS. 2a to 2d show various embodiments of a support element and a receiving device of a mounting system for attaching a structural monument in a desired position in an aircraft cabin, FIG. 3 shows a three-dimensional illustration of a first coupling element for connecting a support element to a receiving device of a mounting system for attaching a structural monument in a desired position in an aircraft cabin, FIG. 4 shows a cross-sectional view of the first coupling element according to FIG. 3, and FIG. 5 shows a detail illustration of a second coupling element for connecting a retaining element of a mounting system for attaching a structural monument in a desired position in an aircraft cabin to a structurally solid component of an aircraft.

A mounting system 10, shown in the figures, for attaching a structural monument in a desired position in an aircraft cabin comprises a support element 12 that can be connected to a base body 14 of the structural monument in a pedestal area of the structural monument. The structural monument can be, for example, an aircraft galley. In the arrangement illustrated in FIG. 1, an underside of a floor plate 16 of the structural monument base body 14 lies on the support element 12. Outer walls 18, 20, 22 of the structural monument base body 14 extend around a periphery of the support element 12.

As can be seen from FIGS. 2a to 2d, the shape of the support element 12 can be adapted to the configuration of the structural monument base body 14. The support element 12 has a plurality of supporting struts 26 which, in the state of the support element 12 when connected to the base body 14 of the structural monument, support sections of partition walls 28 of the structural monument base body 14 (see FIG. 1). The forces transmitted to the support element 12 via the sections of the partition walls 28 are thus introduced into the support element 12 in the area of the supporting struts 26, which are of strengthened design. Two positioning struts 30, 32 extend, parallel to one another, between the supporting struts 26 of the support element 12 and, in the state of the support element 12 when connected to the structural monument base body 14, receive between them a section of a partition wall 28 of the structural monument base body 14 that is not supported by the supporting struts 26.

To stiffen the support-element structure, the support element 12 is provided with diagonally extending stiffening struts 33. The support element 12 further comprises connecting struts 34, 36 which are each arranged in pairs parallel to one another. As will be explained in more detail later, the connecting struts 34, 36 serve to attach a first coupling element 38 to the support element 12 (see FIG. 3). Relative to outer struts 40, 42, the connecting struts 34, 36 form, together with intermediate struts 44, 46 connecting the connecting struts 34, 36, projections 48 adjacent to the outer struts 40, 42. In the state of the support element 12 when connected to the structural monument base body 14, the projections 48 are received in corresponding recesses formed in the outer walls 18, 24 of the structural monument base body 14.

The mounting system 10 further comprises a receiving device 50 that can be attached in the area of the floor of the aircraft cabin. As can best be seen in FIGS. 2a to 2d, the receiving device 50 comprises a plurality of rails 52 that can be attached in the area of the floor of the aircraft cabin. The rails 52 can be attached to a floor panel supported by cross-members of the aircraft structure, but also directly to the crossmembers of the aircraft structure itself. As is evident from FIGS. 2a to 2d, the rails 52 can be attached at different positions in the area of the floor of the aircraft cabin. The receiving device 50 can further comprise a varying number of rails 52.

As can best be seen from FIG. 3, the first coupling element 38 serves to connect the support element 12 to a rail 52 of the receiving device 50. The first coupling element 38, illustrated in FIGS. 3 and 4, comprises a supporting structure 54 which comprises a base element 56, a connecting element 58 serving to connect the first coupling element 38 to the support element 12, and a damping element 60 positioned between the base element 56 and the connecting element 58. The first coupling element 38 further comprises an attaching element 62. The rail 52 of the receiving device 50 comprises a receiving area 64 which is formed by a C-profile element and in which circular and slot-shaped openings 66, 68 are alternately formed. The attaching element 62 is configured in complementary fashion to the receiving area 64 of the rail 52. For example, the attaching element 62 can have a head provided for reception in a circular opening 66 of the receiving area 64.

The first coupling element 38 further comprises a locking device 70. In the unlocked state of the locking device 70, the attaching element 62 can be displaced in the receiving area 64 of the rail 52 relative to the supporting structure 54. As a result, for example a head of the attaching element 62 can be brought into a position where it is retained in the receiving area 64 of the rail 52 by arms of the C-profile element which delimit a slot-shaped opening 68 of the receiving area 64 of the rail 52. By contrast, in the locked state, the locking device 70 ensures a fixing of the attaching element 62 relative to the supporting structure 54 of the first coupling element and the rail 52.

In order to enable a connection of the first coupling element 38 to the support element 12, the connecting struts 34, 36 of the support element 12 are provided with bores 72, 74. Corresponding bores are formed in the connecting element 58 of the first coupling element 38. As a result, the connecting element 58 and thus the first coupling element 38 can be attached to the support element 12 in a simple manner, for example by screws.

The mounting system further comprises a retaining element 76 that, as can be seen in FIG. 1, can be connected to the structural monument base body 14 in a ceiling area of the structural monument. The retaining element 76 comprises a plurality of supporting struts 78 which, in the state of the retaining element 76 when connected to the structural monument base body 14, are supported directly by outer walls 18, 24 and individual partition walls 28 of the structural monument base body 14. Forces transmitted by the structural monument base body 14 to the retaining element 76 via the outer walls 18, 24 and the partition walls 28 are thus introduced into the retaining element 76 at least partly in the area of the supporting struts 78. To stiffen the retaining-element structure, the retaining element 76 is provided with diagonally extending stiffening struts 80. Finally, the retaining element 76 comprises connecting struts 82, 84 which each serve to connect a second coupling element 86 to the retaining element 76. In the arrangement shown in FIG. 1, the mounting system 10 comprises two second coupling elements 86.

The second coupling elements 86 serve to attach the retaining element 76 and thus the structural monument base body 14 to a structurally solid component of the aircraft. The structurally solid component can be a component fixed rigidly to the aircraft structure or the aircraft structure itself. As can best be seen from FIG. 5, each second coupling element 86 comprises a connecting element 88 configured in the form of a four-legged stand. The four legs 90, 92, 94, 96 of the connecting element 88 are supported on a supporting strut 78 and two connecting struts 82, 84, adjacent to the supporting strut 78, of the retaining element 76.

An attaching element 97 of variable length for connecting the retaining element 76 to a structurally solid component of the aircraft is connected to the connecting element 88. The attaching element 97 comprises a first tension bar 98 pivotably connected to the connecting element 88. A second tension bar 100 is pivotably articulated on an end of the first tension bar 98 facing away from the connecting element 88. An end of the second tension bar 100 facing away from the first tension bar 98 can be connected to the structurally solid component of the aircraft. Furthermore, the end of the first tension bar 98 facing way from the connecting element 88 can be connected to a structurally solid component of the aircraft in the area of the connection of the first tension bar 98 to the second tension bar 100. The first and/or the second tension bar 98, 100 is/are of telescopic design. As a result, it is possible to compensate for tolerances. Furthermore, it is possible to displace the structural monument base body with the retaining element 76 attached thereto and attach it at another position, without the need to release the connection, established via the connecting element 88, of the retaining element 76 to the structurally solid component of the aircraft for this purpose.

The invention claimed is:

1. Mounting system for attaching a structural monument in a desired position in an aircraft cabin, having:
    a support element that is connectable to a base body of the structural monument in a pedestal area of the structural monument,
    a receiving device that is attachable in the area of a floor of the aircraft cabin,
    a first coupling element attached to the support element, designed for connecting the support element to the receiving device that is attachable in the area of a floor of the aircraft cabin,
    a retaining element that is connectable to the base body of the structural monument in a ceiling area of the structural monument, and
    a second coupling element attached to the retaining element, designed for connecting the retaining element to a structurally solid component of the aircraft, characterised in that the support element is designed to support, when connected to the base body of the structural monument, a floor element of the structural monument base body and comprises a plurality of connecting struts for attaching the first coupling element to the support element, the connecting struts of the support element extending, when the mounting system is mounted in an aircraft, substantially parallel to the floor element of the structural monument base body and substantially perpendicularly to the receiving device attached in the area of the floor of the aircraft cabin.

2. Mounting system according to claim 1, characterised in that the receiving device comprises at least one rail and/or a plurality of individual receiving elements that can be attached in a pattern in the area of a floor of the aircraft cabin.

3. Mounting system according to claim 1, characterised in that the first coupling element comprises a supporting structure for supporting the support element and an attaching element, configured in complementary fashion to a receiving area of the receiving device, for connecting the first coupling element to the receiving device.

4. Mounting system according to claim 3, characterised in that the first coupling element comprises a locking device, the attaching element being displaceable, in the unlocked state of the locking device, in the receiving area of the receiving device relative to the supporting structure, and the attaching element being fixable, in the locked state of the locking device, in a desired position in the receiving area of the receiving device and relative to the supporting structure.

5. Mounting system according to claim 3, characterised in that the supporting structure of the first coupling element comprises a base element which is supported on the receiving device when the first coupling element is connected to the receiving device, a connecting element for connecting the first coupling element to the support element and a damping element arranged between the base element and the connecting element.

6. Mounting system according to claim 1, characterised in that the support element comprises a plurality of supporting struts which are shaped and positioned such that, when the support element is connected to the base body of the structural monument, forces transmitted via outer and/or partition walls of the structural monument base body are introduced into the support element at least partly in the area of the supporting struts.

7. Mounting system according to claim 1, characterised in that the support element comprises a plurality of stiffening struts for stiffening the support element and/or a plurality of positioning struts for positioning an outer and/or a partition wall of the structural monument base body relative to the support element.

8. Mounting system according to claim 1, characterised in that the second coupling element comprises a connecting element for connecting the second coupling element to the retaining element, the connecting element of the second coupling element being configured in the form of a four-legged stand and/or attachable to the retaining element at different positions.

9. Mounting system according to claim 8, characterised in that the second coupling element comprises an attaching element of variable length for connecting the retaining element to the structurally solid component of the aircraft.

10. Mounting system according to claim 9, characterised in that the attaching element of the second coupling element comprises a first tension bar pivotably connected to the connecting element of the second coupling element.

11. Mounting system according to claim 10, characterised in that the attaching element of the second coupling element comprises a second tension bar pivotably connected to the first tension bar of the second coupling element.

12. Mounting system according to claim 11, characterised in that the first and/or the second tension bar of the second coupling element are/is of telescopic design.

13. Mounting system according to claim 1, characterised in that the retaining element comprises a plurality of supporting struts which are shaped and positioned such that, when the retaining element is connected to the base body of the structural monument, forces transmitted via outer and/or partition walls of the structural monument base body are introduced into the retaining element at least partly in the area of the supporting struts.

14. Mounting system according to claim 1, characterised in that the retaining element comprises a plurality of stiffening struts for stiffening the retaining element and/or a plurality of connecting struts for attaching the second coupling element to the retaining element.

15. Use of a mounting system according to claim 1 for attaching an aircraft galley in a desired position in an aircraft cabin.

* * * * *